(12) United States Patent
Kline et al.

(10) Patent No.: US 10,769,755 B1
(45) Date of Patent: Sep. 8, 2020

(54) DYNAMIC CONTEXTUAL DISPLAY OF KEY IMAGES

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/373,820

(22) Filed: Apr. 3, 2019

(51) Int. Cl.
*G06T 3/40* (2006.01)
*H04N 9/31* (2006.01)

(52) U.S. Cl.
CPC ............ *G06T 3/40* (2013.01); *H04N 9/3188* (2013.01)

(58) Field of Classification Search
CPC .............. G06T 3/40; G09G 2340/0442; G09G 2340/045; H04N 9/3188; G06F 1/1652; G06F 2203/04806
See application file for complete search history.

(56) References Cited

U.S. PATENT DOCUMENTS

| | | | |
|---|---|---|---|
| 7,346,856 B2 | 3/2008 | Nguyen et al. | |
| 9,355,432 B1 | 5/2016 | Goldman | |
| 2013/0132190 A1 | 5/2013 | Lagle Ruiz et al. | |
| 2016/0029474 A1 | 1/2016 | Cho et al. | |
| 2016/0033999 A1 | 2/2016 | Browning | |
| 2016/0112667 A1* | 4/2016 | Park | H04N 21/4886 348/739 |
| 2016/0120023 A1 | 4/2016 | Choi et al. | |
| 2016/0163241 A1 | 6/2016 | Lee et al. | |
| 2016/0307545 A1 | 10/2016 | Lee et al. | |
| 2016/0373654 A1* | 12/2016 | Kwon | G09G 5/373 |
| 2017/0140504 A1* | 5/2017 | Jeong | G06T 3/40 |
| 2017/0147189 A1* | 5/2017 | Ryu | G06F 3/04845 |
| 2017/0154609 A1* | 6/2017 | Yoon | G06F 3/0412 |
| 2018/0137840 A1* | 5/2018 | Nemoto | G09G 3/00 |

(Continued)

OTHER PUBLICATIONS

Ciotti, "7 Marketing Lessons from Eye-Tracking Studies," NeilPatel.com; URL: https://neilpatel.com/blog/eye-tracking-studies/. Retrieved on Mar. 26, 2019. 26 pages.

(Continued)

*Primary Examiner* — Jeffery A Brier
(74) *Attorney, Agent, or Firm* — Cantor Colburn LLP; Tihon Poltavets

(57) ABSTRACT

Methods, systems and computer program products for providing a dynamic contextual display of key images are provided. Aspects include identifying one or more key image sections from an image being displayed on a first surface area of a display screen by performing contextual image analysis. Aspects also include reducing the first surface area of the display screen to form a second surface area of the display screen such that second surface area is smaller than the first surface area. Aspects also include generating a modified image by deleting one or more portions of the image based on the second surface area. The modified image includes the one or more key image sections and the one or more key image sections are contextually arranged within the modified image. Aspects also include displaying the modified image on the second surface area of the display screen.

20 Claims, 8 Drawing Sheets

(56) References Cited

U.S. PATENT DOCUMENTS

2018/0275770 A1* 9/2018 Kang .................... G06F 3/0485
2018/0329514 A1* 11/2018 Kwon ..................... G06F 3/03

OTHER PUBLICATIONS

Davies, "Watch Samsung's rollable display in action," SlashGear.com; URL: https://www.slashgear.com/watch-samsungs-rollable-display-in-action-24441409/. Retrieved on Mar. 26, 2019. 9 pages.
Google, "About responsive ad units," Google.com; URL: https://support.google.com/adsense/answer/3213689?hl=en. Retrieved on Mar. 26, 2019. 2 pages.
Kang et al., "Content-aware Image Retargeting for Image Display on Foldable Mobile Devices," Science Direct, Procedia Computer Science, The 12th International Conference on Mobile Systems and Pervasive Computing (MobiSPC 2015), vol. 56, 2015, pp. 104-110.
Phonearena, "Samsung flexible display patents include pull-out and rollable concept units," PhoneArena.com; Mar. 7, 2012; URL: https://www.phonearena.com/news/Samsung-flexible-display-patents-include-pull-out-and-rollable-concept-units_id27765. Retrieved on Mar. 26, 2019. 21 pages.
Statt, "LG made an 18-inch display you can roll up like a newspaper," TheVerge.com; Jan. 3, 2016; URL: https://www.theverge.com/2016/1/3/10706180/lg-rollable-display-flexible-screen-announced-ces-2016. Retrieved on Mar. 26, 2019. 1 page.
Wikipedia, "Rollable display," Wikipedia.org; URL: https://en.wikipedia.org/wiki/Rollable_display. Retrieved on Mar. 26, 2019. 3 pages.

* cited by examiner

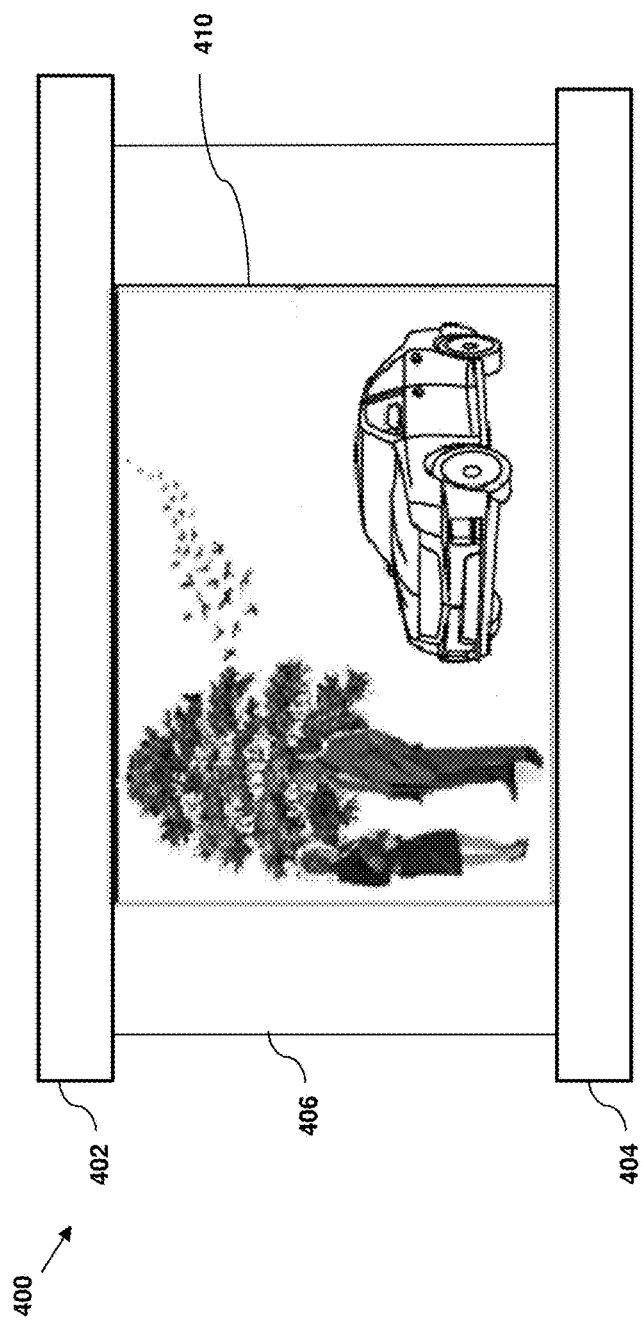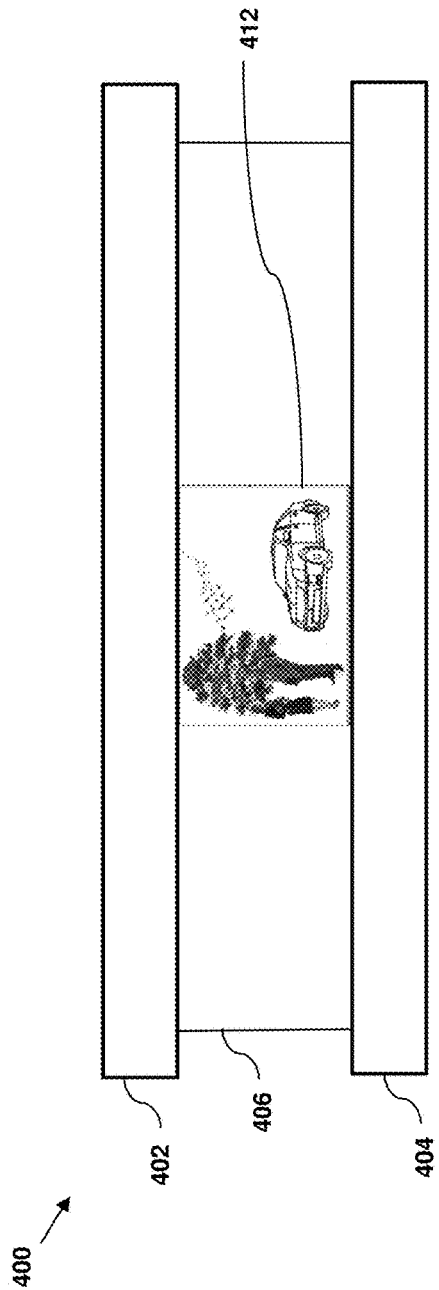
FIG. 4A
FIG. 4B

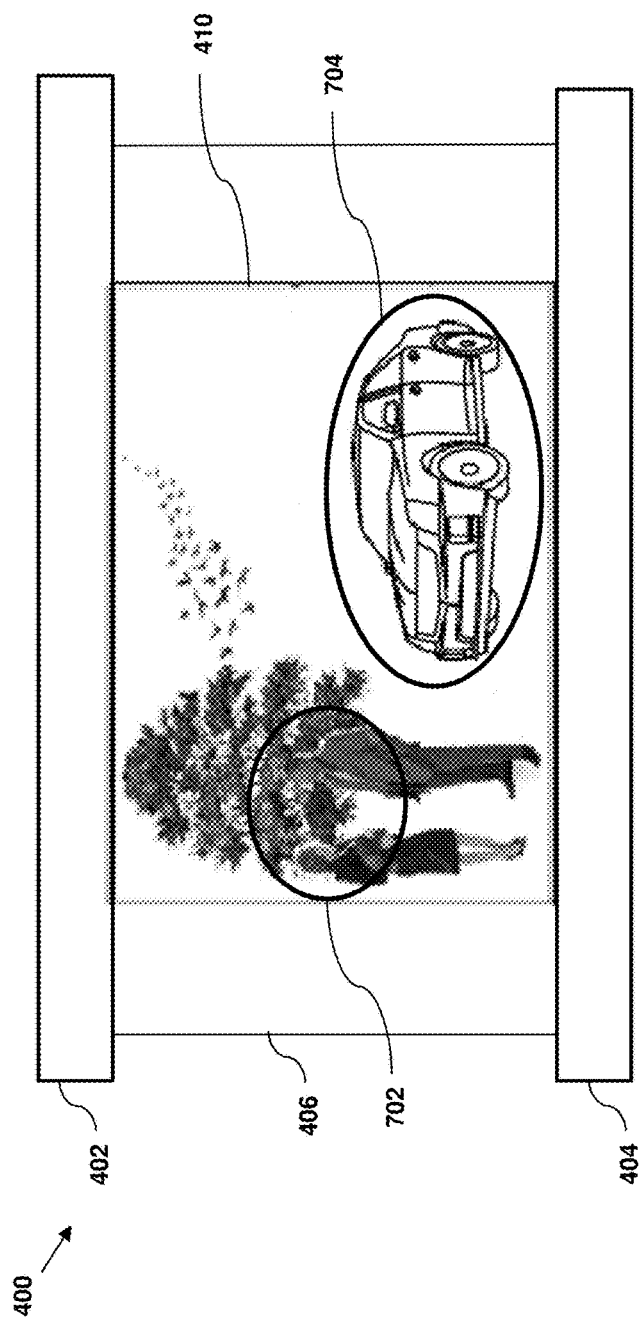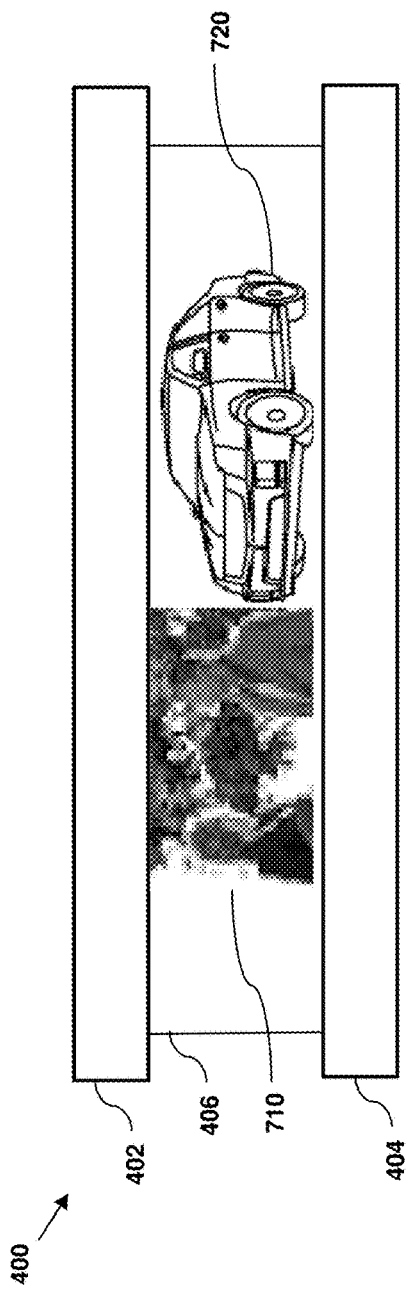

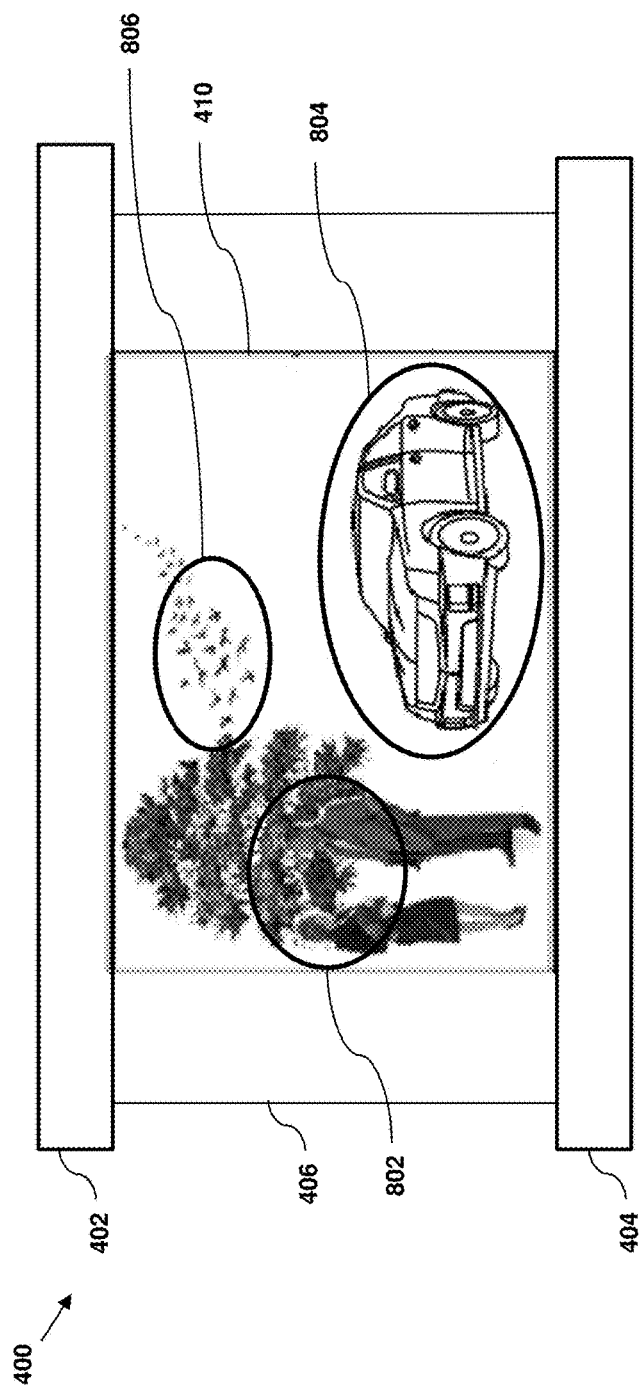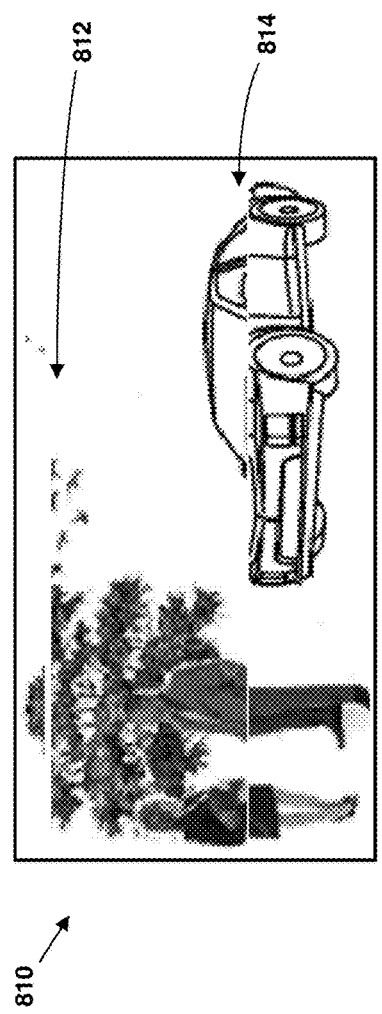

DYNAMIC CONTEXTUAL DISPLAY OF KEY IMAGES

BACKGROUND

The present invention generally relates to adjustable-screen display devices, and more specifically, to providing a dynamic contextual display of key images.

Adjustable-screen displays, such as retractable projection screens, are commonly used to display images and videos. While such retractable display screens are traditionally mechanical in operation, new flexible retractable electronic display screens may allow for easier and more ubiquitous use of such display screens in a wider variety of situations. During operation, it is generally desirable to maximize use of the available surface area for display of the display screen when displaying an image or video. However, if a retractable display screen is placed in a state of partial retraction, it is generally necessary to adjust the image projected onto the display screen to accommodate the newly available surface area. When a display screen in partially retracted, the aspect ratio is generally greatly increased, which can negatively impact the optimal usage of the available space and the viewability of the image or video.

SUMMARY

Embodiments of the present invention are directed to a computer-implemented method for providing a dynamic contextual display of key images. A non-limiting example of the computer-implemented method includes identifying one or more key image sections from an image being displayed on a first surface area of a display screen by performing contextual image analysis. The method also includes reducing the first surface area of the display screen to form a second surface area of the display screen such that second surface area is smaller than the first surface area. The method also includes generating a modified image based on the second surface area by deleting one or more portions of the image. The modified image includes the one or more key image sections and the one or more key image sections are contextually arranged within the modified image. The method also includes displaying the modified image on the second surface area of the display screen.

Embodiments of the present invention are directed to a system for providing a dynamic contextual display of key images. The system includes a memory having computer readable computer instructions, and a processor for executing the computer readable instructions. The computer readable instructions include instructions for identifying one or more key image sections from an image being displayed on a first surface area of a display screen by performing contextual image analysis. The computer readable instructions also include instructions for reducing the first surface area of the display screen to form a second surface area of the display screen such that second surface area is smaller than the first surface area. The computer readable instructions also include instructions for generating a modified image based on the second surface area by deleting one or more portions of the image. The modified image includes the one or more key image sections and the one or more key image sections are contextually arranged within the modified image. The computer readable instructions also include instructions for displaying the modified image on the second surface area of the display screen.

Embodiments of the invention are directed to a computer program product for providing a dynamic contextual display of key images, the computer program product comprising a computer readable storage medium having program instructions embodied therewith. The computer readable storage medium is not a transitory signal per se. The program instructions are executable by a processor to cause the processor to perform a method. A non-limiting example of the method includes identifying one or more key image sections from an image being displayed on a first surface area of a display screen by performing contextual image analysis. The method also includes reducing the first surface area of the display screen to form a second surface area of the display screen such that second surface area is smaller than the first surface area. The method also includes generating a modified image based on the second surface area by deleting one or more portions of the image. The modified image includes the one or more key image sections and the one or more key image sections are contextually arranged within the modified image. The method also includes displaying the modified image on the second surface area of the display screen.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4A depicts an image being displayed on a display screen having a first surface area;

FIG. 4B depicts a modified image being displayed on a display screen having a second surface area;

FIG. 7A depicts identified key image sections of an image being displayed on a display screen having a first surface area according to one or more embodiments of the invention;

FIG. 7B depicts a contextually arranged modified image being displayed on a display screen having a second surface area according to one or more embodiments of the invention;

FIG. 8A depicts another example of identified key image sections of an image being displayed on a display screen having a first surface area according to one or more embodiments of the invention; and FIG. 8B depicts a modified image that has been contextually modified for display on a display screen having a second surface area according to one or more embodiments of the invention.

Figure 1:
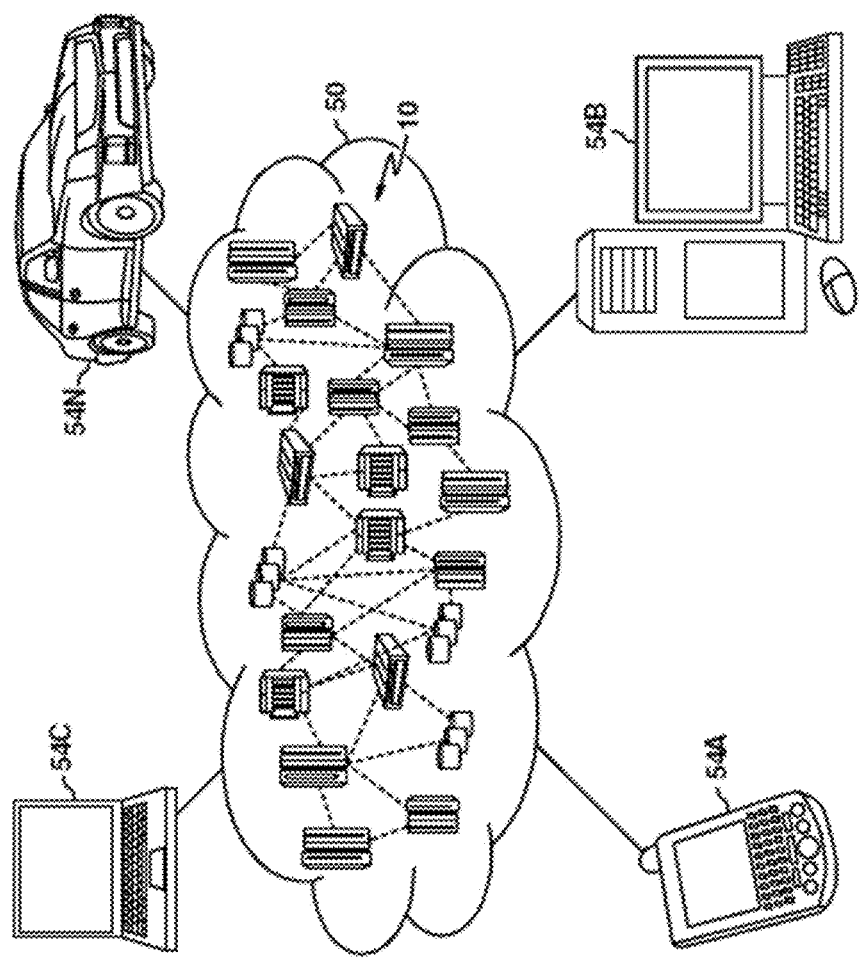
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
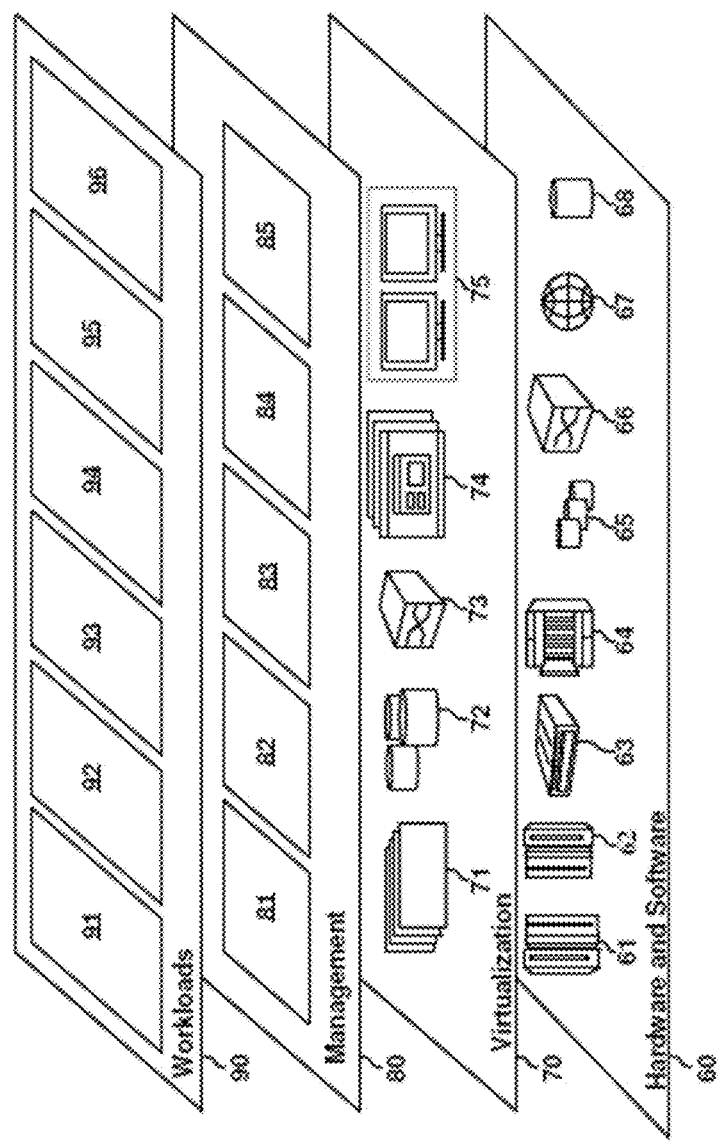
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing a dynamic contextual display of key images 96.

Figure 3:
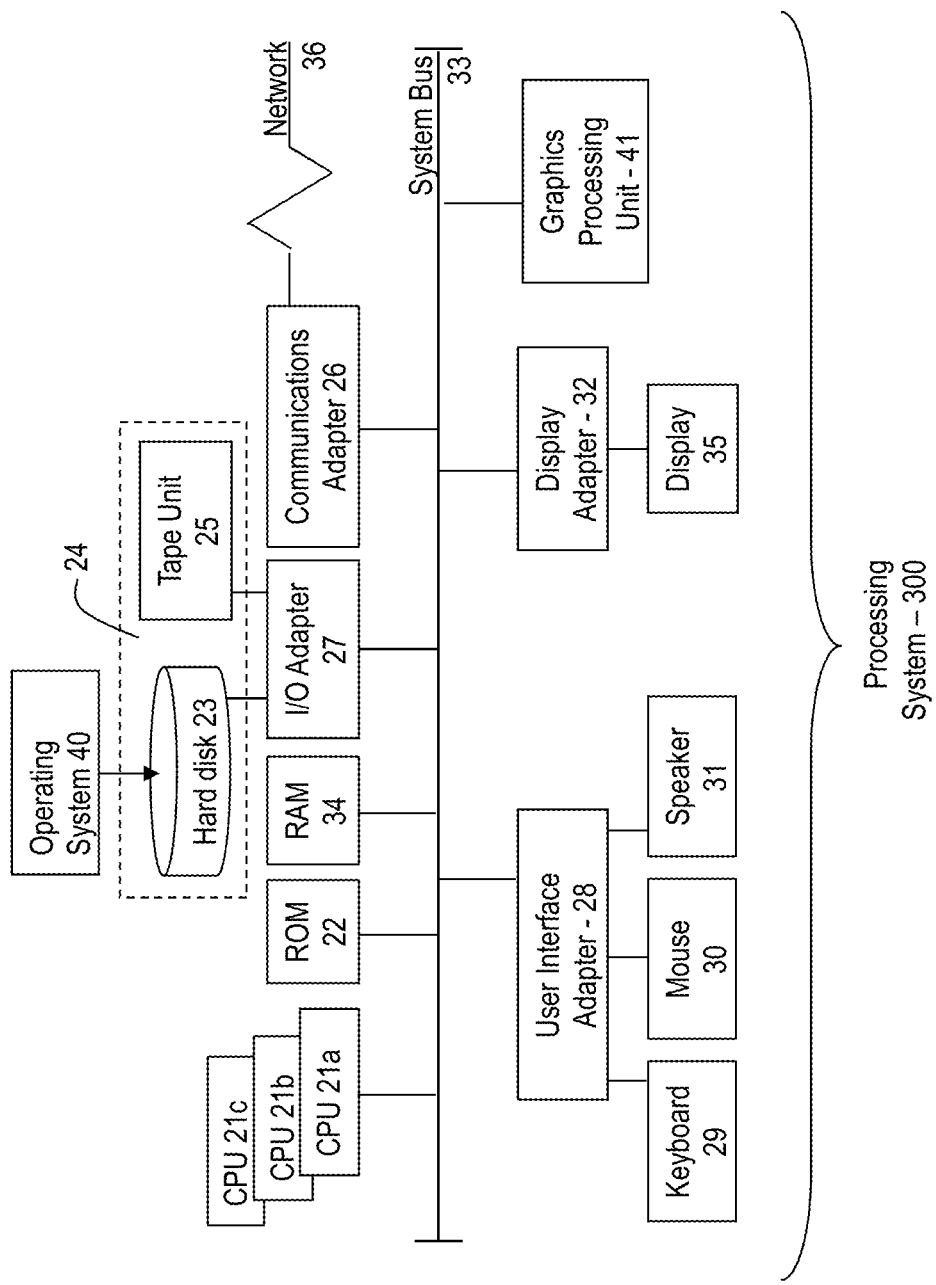
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21*a*, 21*b*, 21*c*, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

In exemplary embodiments, a system for providing a dynamic contextual display of key images is provided. In exemplary embodiments, the system may perform a contextual analysis of an image or video to identify one or more key image sections that are displayed in the image or video and generate a modified image in which the one or more key image sections are contextually arranged for display on an adjustable display screen that has been retracted to create a smaller surface area for display. A key image section may refer to a portion of the image that represents some concept or aspect of the meaning of the image, which may be in relation to other aspects of the image or video. For example, an image may depict three people interacting in some way, but the conceptual nature of the interaction may be represented by a few key image sections of the image. For example, if the image shows a first-person shaking hands with a second person while a third person waves at the first person from afar, the meaning of the scene may be conveyed by isolating key image sections of the scene that can include, for example, the faces of each person, the handshake between the first and second person and with waving hand of the third person. In other words, it may not be necessary to view the full bodies of any of the people, their clothes, or their surroundings in order to convey the meaning of the scene, and so it can be possible to remove these non-key aspects from the image while maintaining the conceptual nature of what is occurring in the scene. Further, the system may "cut out" and arrange the key image sections relative to one another in a manner that maintains the context while attempting to minimize the amount of space needed to show the modified scene. For example, taking the previously described case, the heads of the first and second people may be arranged with a handshake positioned between them, while the head and waving hand of the third person is placed behind the second person in a position that is facing the first person.

As will be appreciated by those of skill in the art, when a retractable screen that is displaying an image (e.g., via projection or electronic display) is then partially retracted, the displayed image may be "cut off" at the edges as the bounds of the display screen recede beyond the previous bounds of the image. FIGS. 4A and 4B show an example of a retractable display screen 400 having a display screen 406 positioned between an upper border 402 and a lower border 404. As shown in FIG. 4A, when the display screen 406 is fully extended, it may accommodate the display on an image 410 that is relatively large and has an aspect ratio that is similar to the display screen 406. FIG. 4B shows the display screen 406 in a state of partial retraction. As shown, it may be generally necessary to display a reduced size image 412 to accommodate the newly available surface area of the display screen, however, simply reducing the size of the image may cause aspects of the image to become difficult to see such that a viewer may no longer be able to see and/or understand what is being portrayed by the image. As shown in FIG. 4B, this problem may be further exacerbated by the fact that the aspect ratio of a retractable screen will generally change as one dimension (e.g., the height) of the screen is diminished while the other dimension (e.g., the length) of the screen remains the same, which generally results in large portions of available surface area becoming unusable as the image displayed on the partially retracted screen has an unchanging aspect ratio, resulting in significant unused surface area in the second dimension of the display screen. Embodiments of the present disclosure solve these problems by providing a modified image that includes key image sections that are contextually arranged and may be resized for display on the partially retracted displayed screen. By displaying contextually arranged key image sections, the meaning of the image may be preserved such that a viewer may be able to still understand the concepts and contexts presented by the image, despite the fact that the surface area available for display of images has been reduced. Further, in some embodiments, the system may resize and/or arrange key image sections taken from the original image such that it may attempt to maximize the space presented by the partially retracted display screen and use space that may have been otherwise unutilized as described above. In some embodiments, the system can maintain user profiles that can provide preferences of when and how to trigger the display of the contextually arranged key image sections, for example, based on a user's eye sight or other such feedback.

Figure 5:
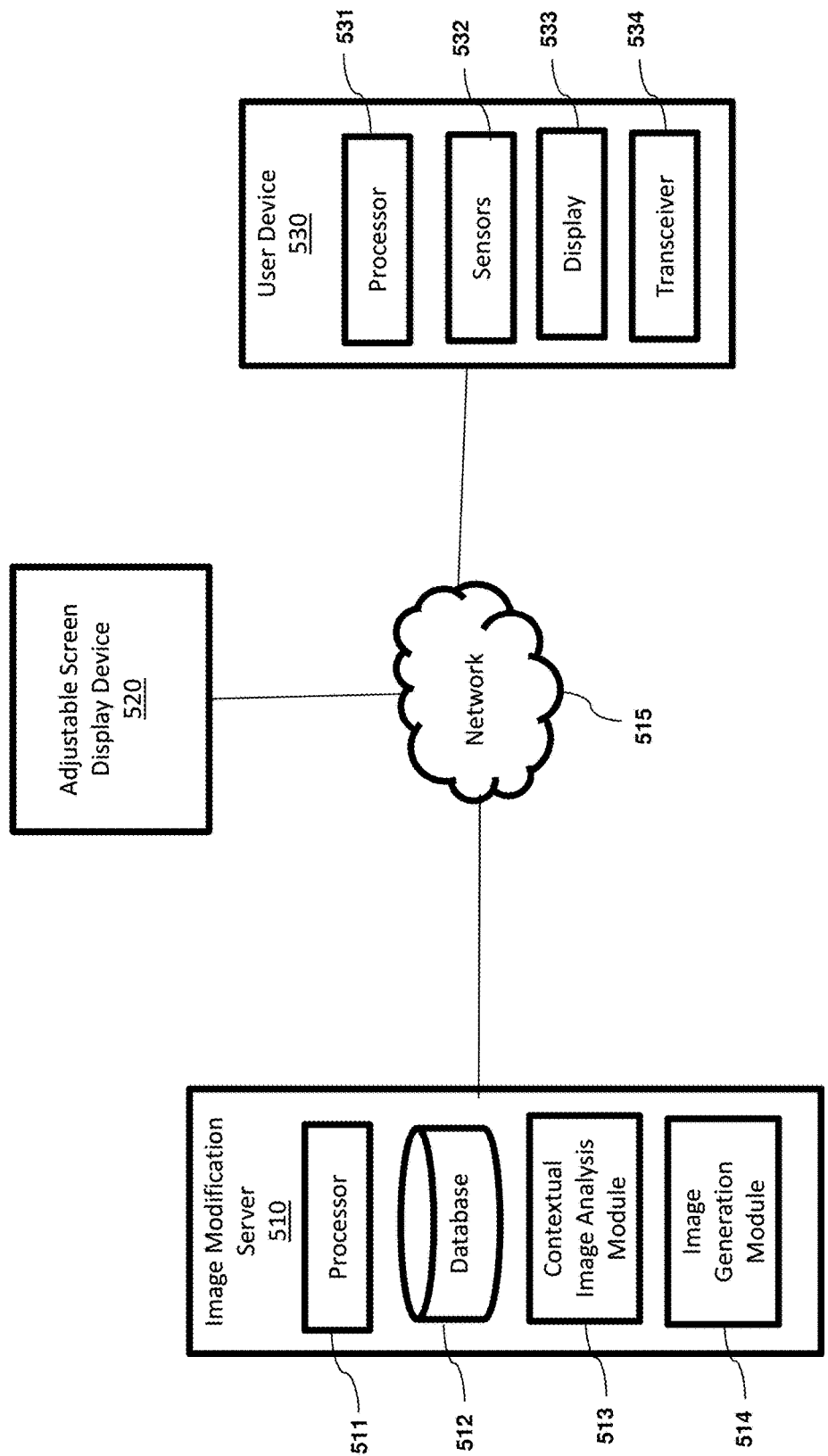
FIG. 5 depicts a system upon which providing a dynamic contextual display of key images may be implemented according to one or more embodiments of the present invention.

Turning now to FIG. 5, a system 500 for providing a dynamic contextual display of key images will now be described in accordance with an embodiment. The system 500 includes an image modification server 510 in communication with an adjustable screen display device 520 and a user device 530 via communications network 515. The communications network 515 may be one or more of, or a combination of, public (e.g., Internet), private (e.g., local area network, wide area network, virtual private network), and may include wireless and wireline transmission systems (e.g., satellite, cellular network, terrestrial networks, etc.).

According to some embodiments, image modification server 510 may include a processor 511 for executing the functionality described herein, a memory 512 for storing data used in executing the functionality described herein, a contextual image analysis module 513 for identifying key image sections of an image, and an image generation module 514 for generating modified images. Memory 512 can store user profiles, preferences and thresholds that can be used to trigger the generation of a modified image based on one or more of the size of display screen surface area available for display of images (i.e., the surface area of the extended or unretracted portion of the display screen), the aspect ratio of the surface area of the display screen that is available for display, the aspect ratio of an image if it were to be displayed on the available surface area of the display screen (e.g., by maximizing either the height or length of the image until it reaches a boundary of the available surface area of the display screen), the size of one or more objects in the image as displayed on the available surface area of the display screen, or any other such suitable metrics. In some embodiments, the contextual image analysis module 513 of the image modification server 510 may be configured to perform a contextual image analysis on an image or video and identify key image sections of the image/video. For example, as will be appreciated by those of skill in the art, the image modification server 510 may use image recognition and object detection techniques that can detect and identify objects, items, people, buildings, animals, plants, environmental features (e.g., sky, tree line, etc.), vehicles and various other types of objects that may be depicted in an image or video, which may convey the contextual meaning of the image or video. According to some embodiments, the contextual image analysis module 513 can determine and track relative distances between identified (or unidentified) objects using visual distance measurement techniques.

Further, in some embodiments, adjustable screen display device 520 may include a camera or other image capture device that may be configured to detect and track the direction of one or more viewer's gaze to determine which portions of an image or video the viewer is most interested in looking at. This information can be used by contextual image analysis module 513 to identify contextual key images section by, for example, determining which objects are the subject to a high degree of focus from the viewer(s). In some embodiments, adjustable screen display device 520 may further be configured to track changes in the viewer's facial expression, body language, gestures or other visual cues based on images obtained by a camera and/or changes in biometric signals of the viewer based on biometric data received from, for example, a wearable device associated with the viewer. According to some embodiments, adjustable screen display device 520 may identify a key image section based on one or more of the user's gaze, a change in visual cues (e.g., facial expression) and/or a change in a biometric signal (e.g., increased pulse). In some embodiments, adjustable screen display device 520 may identify a key image section by identifying a plurality of aspects (e.g., people, objects, items, scenery, actions, movements, etc.) of an image (e.g., via image recognition techniques) and then comparing the identified aspects to a user profile that includes information about a user's interests and/or previous behavior. For example, if a user profile indicates that a user is interested in cars and the system has identified a car in an image, then the system may determine that a key image section exists at the portion of the image that includes the car. User profile data can be collected from observing past user behavior (e.g., previous gaze tracking data in relation to previous videos), social networking information, or any other suitable source of information that may provide insight to a user's interests. In some embodiments, user profile data may be aggregated across many users of the system to determine what the public at large may be interested in to determine key image sections. According to some embodiments, other methods of identifying key image sections of an image that may be known in the art may alternatively or additionally be utilized by the contextual image analysis module 513 to identify key image sections. After identifying a key image section, in some embodiments, the contextual image analysis module 513 may set a virtual contour around each key image section to create a boundary around each key image section that denotes an area of the image or video containing the key image section.

According to some embodiments, the image generation module 514 may be configured to generate a new (i.e., modified) image from an image containing identified key image sections. The modified image may eliminate portions of the original image that the system has determined are not necessary in order to retain the meaning of the image. According to some embodiments, the image generation module 514 may "cut out" the key image sections from the image and contextually arrange them relative to one another in the new modified image. In some embodiments, one or more of the key image sections may be enlarged in one or more dimensions such that when displayed, the key image section of the modified image may appear larger than the key image section of the unmodified image, allowing a user to better see the key image section. The key image sections may be resized and/or positioned within the modified image based on their relative position to one another in the original image and/or based on customized rules that are based on the content of the images (e.g., cropping out unidentified objects/people) and/or the dimensions of the display (e.g., generating a modified image having an aspect ratio that is based on the aspect ratio, length and/or height of the available display). In some embodiments, the image generation module 514 may receive or determine the dimensions and/or aspect ratio of the surface area of the display screen that is available for use in display, for example, in response to a user causing the available surface area to be resized in response to retracting a portion of the screen. The image generation module 514 may use the dimensions and/or aspect ratio of the available display screen to determine how to size and arrange the key image sections in the modified image so that the modified image may attempt to best utilize the available surface area for display. In this way, the image generation module 514 can create a modified image that can be displayed on a partially retracted display screen that uses portions of the screen that would may previously gone unused. According to some embodiments, the modified image may be displayed on the partially retracted display screen by, for example, supplying the modified image to the adjustable screen display device 520 or another device (e.g., a projector device) for causing the modified image to be displayed.

According to some embodiments, the image modification server 510 may dynamically identify key image sections and generate modified images for display. For example, if a video is being displayed on the display screen, the image modification server 510 may continuously identify key image sections and generate modified images for display such that a modified video depicting the key image sections may be displayed on a partially retracted display screen. Further, in some embodiments, the image modification server 510 may dynamically generate modified images for display in response to the dynamic retraction of the display screen. In other words, as will be understood, when the display screen is in the process of retracting, the amount of surface area available for display and the aspect ratio of the amount of surface area available for display may be continuously changing. In this case, the image generation module 514 may be configured to receive data representative of the changing available surface area of the retractable display screen and may dynamically resize and/or rearrange portions of the modified image to accommodate the changing size of the available surface area of the display screen as it changes. According to some embodiments, the image generation module 514 may refrain from generating a modified image until a threshold size or aspect ratio of a partially retracted display screen has been met. In other words, in some embodiments, if the display screen is only retracted a small amount, the image generation module 514 may simply resize the original image (while maintaining the original image's aspect ratio) to fit the new available size of the display screen. However, once the retraction surpasses a predetermined threshold, such as for example, dropping below a minimum dimension (e.g., the screen is retracted beyond a minimum height of the screen) or exceeding a maximum aspect ratio, the image modification server 510 may trigger the creation of a modified image based on identified key image sections.

In some embodiments, an adjustable screen display device 520 may be a device that is configured to control an adjustable (e.g., retractable) display screen. Adjustable screen display device 520 may be an electronic device that for example, include some or all of the elements of processing system 300. As will be appreciated by those of skill in art, a retractable display screen may be a flexible screen that is wrapped around a roller (or similar mechanism) such that it may be extended at one end to unroll (i.e., extend) from the roller. According to some embodiments, the roller may be electronically activated to retract or extend the screen. According to some embodiments, a display screen may be configured for use with a projector or projection device. In some embodiments, a display screen may be an electronic display screen that generates an electronic image for display by the display screen. According to some embodiments, the adjustable screen display device 520 may include one or more sensors that may be configured to track the degree of extension and/or retraction of the display screen, such that at any point in time the adjustable screen display device 520 may know the degree to which the display screen is extended or retracted. According to some embodiments, the adjustable screen display device 520 may store the dimensions of the fully extended display screen. Thus, as will be understood by those of skill in the art, in some embodiments, the adjustable screen display device 520 may be configured to determine the aspect ratio of the portion of the display screen that is extended for use, based on the degree of retraction and the known dimensions of the full display screen. According to some embodiments, adjustable screen display device 520 may communicate information to the image modification server 510, such as the full dimensions of the display screen, the degree of extension or retraction of the display screen, and/or the aspect ratio of the display screen. Although adjustable screen display device 520 is depicted in FIG. 4 as being a separate device from image modification server 510, in some embodiments it is contemplated that a single device may perform some or all of the functions of both the image modification server 510 and the adjustable screen display device 520.

In exemplary embodiments, user devices 530 can include, but are not limited to, a smartphone, a wearable device such as a smartwatch, an augmented reality headset, a tablet, a computer system such as the one shown in FIG. 3, a smart speaker, a television, or any other suitable electronic device. The user device 530 includes a processor 531, one or more sensors 532, a display 533 and a transceiver 534. The sensors 532 can include one or more of an image capture device (e.g., digital camera) for obtaining images and/or videos, a microphone for obtaining audio recordings, and a location sensor for obtaining location data of the user device (e.g., GPS coordinates). Sensors 532 of the user device 530 can include one or more input devices, such as a keyboard (either physical or digital) for receiving user input text. Text can also be input orally via a microphone using voice recognition. In some embodiments, display 533 is configured to display images and/or video. In some embodiments, display 533 can be a touchscreen that may be configured to detect tactile user inputs (e.g., typing, pressing, swiping, etc.). Transceiver 534 can be configured to allow a user device 530 to communicate with other devices via communications network 515 (e.g., via Wi-Fi, cellular communications, etc.). According to some embodiments, a user of a user device 530 may access and modify a user profile stored by image modification server 510. According to some embodiments, user device 530 may include a software application configured to automatically determine user preferences associated with a user profile, by for example, administering a visual test to a user by displaying various images on display 533 and receiving user feedback regarding the user's ability to see and/or understand the meaning of the displayed images.

Figure 6:
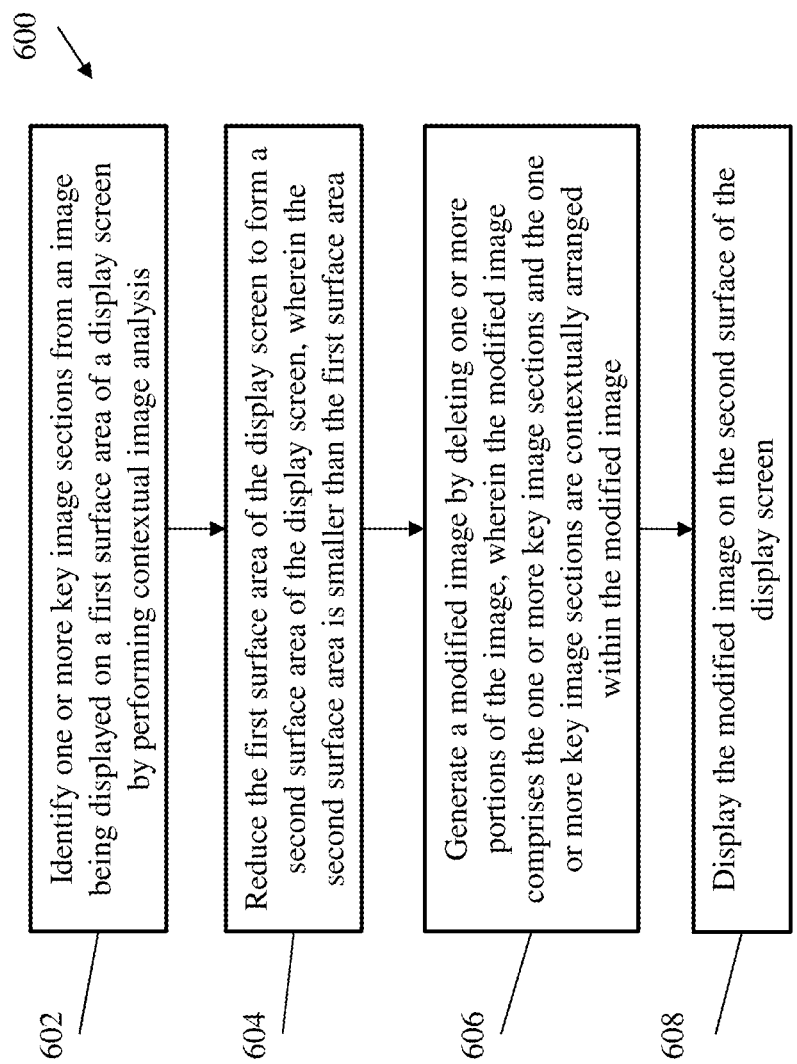
FIG. 6 depicts a flow diagram of a method for providing a dynamic contextual display of key images according to one or more embodiments of the invention.

Turning now to FIG. 6, a flow diagram of a method 600 for providing a dynamic contextual display of key images in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes identifying (e.g., via image modification server 510) one or more key image sections from an image being displayed on a first surface area of a display screen. For example, FIG. 7A shows an image 410 displayed on a fully extended display screen 406, in which the contextual image analysis module 513 of the image modification server 510 has identified a first key image section 702 of two people talking and a second key image section 704 of a nearby vehicle. According to some embodiments, the one or more key image sections may be identified by performing contextual image analysis on one or more images (e.g., via context image analysis module 513), as described previously above.

As shown at block 604, the method includes reducing (e.g., via adjustable screen display device 520) the first surface area of the display screen to form a second surface area of the display screen, for example, such that the second surface area is smaller than the first surface area. For example, as shown in FIG. 7B, the lower border 404 of the adjustable display screen 400 has been raised or retracted such that the display screen 406 is in a state of being partially retracted, thereby reducing the surface area available for display and increasing the aspect ratio of the surface area available for display. According to some embodiments, the image modification server 510 may detect or receive data (e.g., from the adjustable screen display device 520) indicative of the fact that the display screen has been retracted and the degree to which it has been retracted. According to some embodiments, the image modification server 510 may generate and issue instructions to the adjustable screen display device 520 to partially retract the display screen and thus may already have knowledge of the partial retraction of the screen.

In some embodiments, the display screen may be a retractable display screen and reducing the first surface area of the display screen to form a second surface area of the display screen may include retracting a portion of the display screen. According to some embodiments, the system (e.g., image modification server 510 or adjustable screen display device 520) may be configured to determine or obtain the aspect ratio of the surface area of the display screen at any time based on, for example, an amount of retraction of the display screen. As will be appreciated by those of skill in the art, the adjustable screen display device may track the screen position (e.g., via one or more sensors or by tracking the amount of rotation of a roller around which the screen is wound) in terms of how much of the screen is retracted or extended, and based on the degree of retraction of the display screen the height of the viewable portion of the display screen may be determined and compared to the known length of the display screen to determine the aspect ratio of the display screen.

As shown at block 606, the method includes generating a modified image by deleting one or more portions of the image. According to some embodiments, the modified image may be generated based on the second surface area. For example, as shown in FIG. 7B, a modified image may be made up of a first image portion 710 that corresponds to the first key image section and a second image portion 720 that corresponds to the second key image section. Any number of such image portions can be combined together to form a modified image. In some embodiments, the modified image may include the one or more key image sections and the one or more key image sections may be contextually arranged within the modified image. According to some embodiments, contextually arranging the one or more key image sections within the modified image can include providing a spatial arrangement of the one or more key image sections that preserves a meaning of the image, by for example, ordering the key image sections within the modified image from left to right and/or top to bottom in the same sequence as they appear in the original image. For example, as shown in FIG. 7B, the two people are shown facing one another to the left of a vehicle that is facing them, which corresponds to the positioning shown in the original image 410. In some embodiments, the system may place the key image sections in a different left to right and/or top to bottom order if such a new order may maintain the meaning of the image and optimize use of the available screen (e.g., by maximizing the size of a key image section for display).

According to some embodiments, a key image section of the one or more key image sections from the image may be a cropped portion for the image. For example, as shown in FIG. 7B, the first image portion 710 of the modified image is a cropped portion of the original image 410 that includes the first key image section 702 and likewise the second image portion 720 of the modified image is a cropped portion of the original image 410 that includes the second key image section 704. In some embodiments, the cropped portions may be rectangular in shape. As is further shown in FIG. 7B, in some embodiments, the cropped portion of the image may be enlarged in dimensions. For example, as shown in FIG. 7A, the displayed first image portion 710 is larger than the corresponding portion of the displayed original image 702 shown in FIG. 7A, thereby allowing a viewer to more easily see the content of the first key image section 702 in the modified image.

According to some embodiments, the image may be a video image and the method 600 can be performed dynamically on the video images based on an aspect ratio of the second surface area of the display screen. For example, as will be understood, the surface area of the display screen may dynamically change during the process of resizing the screen by for example, retracting a portion of the display screen. As previously described above, the image generation module 514 of image modification server 510 may dynamically change, arrange, and resize the modified image based on the ongoing retraction of the display screen 406 and/or the changing scenes depicted by the video displayed on the display screen 406.

In some embodiments, generating the modified image may be based on a user profile. In some embodiments, the user profile may specify that the generation of the modified image is triggered upon a determination that an aspect ratio of the second surface area exceeds a predetermined threshold. In some embodiments, generating the modified image may be performed in response to receiving (e.g., by image modification server 510) a user input. For example, a user may decide that they are having trouble viewing an original format image or video that is being displayed on a partially retracted screen, and may select (e.g., via an application running on user device 530) to toggle the display to be a modified image displaying key image sections.

According to some embodiments, generating the modified image may include for at least one key image section of the one or more key image sections, identifying a portion of the at least one key image section that is contextually unimportant and deleting the contextually unimportant portion of the at least one key image section. For example, as shown in FIG. 8A, the system has identified three key image sections 802, 804, 806 that in combination, span most of the height of the image 410. Thus, to achieve an appropriate aspect ratio for displaying the image on a partially retracted display screen while maintaining all of the key image sections, it may be necessary to omit horizontal portions of the image 410. FIG. 8B shows a modified image 810 that has been modified for display on a partially retracted display screen by removing a first horizontal portion 812 of the image and a second horizontal portion 814 of the image to reduce the height dimension of the modified image, while maintaining the meaning or concepts presented by the key image sections. In other words, in some embodiments, the system may delete portions of one or more key image sections, so long as the remaining portions are sufficient to convey the overall meaning of the key image sections. Thus, according to some embodiments, the image generation module 514 can be configured to delete one or more portions of one or more key images sections of the image to form a modified image by, for example, determining that a portion of an image that is at least partially included in one or more key image sections is not important for conveying the meaning of the image and deleting that portion from the image. Stated differently, in some embodiments, the system may identify smaller key image sections within a key image section and delete the portion of the key image section that is not identified as being a smaller key image section.

As shown at block 608, the method includes displaying the modified image on the second surface area of the display screen. For example, as shown in FIG. 7B, a modified image that is made up of the first image portion 710 and the second image portion 720 can be displayed on the partially retracted screen 406 in a manner that better utilizes the available surface area for display. As shown, the modified image has been created which has an aspect ratio that more closely matches that of the partially retracted screen, so that more of the available surface area may be used for display and because more surface are is used, the first image portion 710 provides an enlarged version of the original first key image section 702, whereas the second image portion 720 provides a reduced size but full representation of a vehicle that was a large portion of the original image 410. In this way, the system 500 can resize different key image sections in different manners to create a modified image that seeks to maximize use of the display screen surface area that is available for display while displaying the key image sections.

Additional processes may also be included. It should be understood that the process depicted in FIG. 6 represents an illustration and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
identifying, by performing contextual image analysis, one or more key image sections from an image being displayed on a first surface area of a display screen;
reducing the first surface area of the display screen to form a second surface area of the display screen, wherein the second surface area is smaller than the first surface area;
generating, based on the second surface area, a modified image by deleting one or more portions of the image, wherein the modified image comprises the one or more key image sections and the one or more key image sections are contextually arranged within the modified image; and
displaying the modified image on the second surface area of the display screen.

2. The computer-implemented method of claim 1, wherein the one or more key image sections being contextually arranged within the modified image comprises providing a spatial arrangement of the one or more key image sections that preserves a meaning of the image.

3. The computer-implemented method of claim 1, wherein the image comprises a video image and generating the modified image is performed dynamically based on an aspect ratio of the second surface area of the display screen.

4. The computer-implemented method of claim 1, wherein a key image section of the one or more key image sections from the image comprises a cropped portion of the image.

5. The computer-implemented method of claim 4, wherein the cropped portion of the image is enlarged in dimensions.

6. The computer-implemented method of claim 1, wherein generating the modified image is further based on a user profile, wherein the user profile specifies that the generation of the modified image is triggered upon a determination that an aspect ratio of the second surface area exceeds a predetermined threshold.

7. The computer-implemented method of claim 1, wherein generating the modified image further comprises:
for at least one key image section of the one or more key image sections, identifying a portion of the at least one key image section that is contextually unimportant; and
deleting the contextually unimportant portion of the at least one key image section.

8. The computer-implemented method of claim 7, wherein generating the modified image is performed in response to receiving a user input.

9. The computer-implemented method of claim 1, wherein the display screen comprises a retractable display screen and reducing the first surface area of the display screen to form a second surface area of the display screen comprises retracting a portion of the display screen.

10. The computer-implemented method of claim 9, further comprising determining an aspect ratio of the second surface area of the display screen based on an amount of retraction of the display screen.

11. A system comprising:
a processor communicatively coupled to a memory, the processor configured to:
identify, by performing contextual image analysis, one or more key image sections from an image being displayed on a first surface area of a display screen;
reduce the first surface area of the display screen to form a second surface area of the display screen, wherein the second surface area is smaller than the first surface area;
generate, based on the second surface area, a modified image by deleting one or more portions of the image, wherein the modified image comprises the one or more key image sections and the one or more key image sections are contextually arranged within the modified image; and
display the modified image on the second surface area of the display screen.

12. The system of claim 11, wherein the one or more key image sections being contextually arranged within the modified image comprises providing a spatial arrangement of the one or more key image sections that preserves a meaning of the image.

13. The system of claim 11, wherein the image comprises a video image and generating the modified image is performed dynamically based on an aspect ratio of the second surface area of the display screen.

14. The system of claim 11, wherein a key image section of the one or more key image sections from the image comprises a cropped portion of the image.

15. The system of claim 14, wherein the cropped portion of the image is enlarged in dimensions.

16. The system of claim 11, wherein generating the modified image is further based on a user profile, wherein the user profile specifies that the generation of the modified image is triggered upon a determination that an aspect ratio of the second surface area exceeds a predetermined threshold.

17. A computer program product comprising a computer readable storage medium having program instructions embodied therewith the program instructions executable by a computer processor to cause the computer processor to perform a method comprising:
identifying, by performing contextual image analysis, one or more key image sections from an image being displayed on a first surface area of a display screen;
reducing the first surface area of the display screen to form a second surface area of the display screen, wherein the second surface area is smaller than the first surface area;
generating, based on the second surface area, a modified image by deleting one or more portions of the image, wherein the modified image comprises the one or more key image sections and the one or more key image sections are contextually arranged within the modified image; and
displaying the modified image on the second surface area of the display screen.

18. The computer program product of claim 17, wherein the one or more key image sections being contextually arranged within the modified image comprises providing a spatial arrangement of the one or more key image sections that preserves a meaning of the image.

19. The computer program product of claim 17, wherein the image comprises a video image and generating the modified image is performed dynamically based on an aspect ratio of the second surface area of the display screen.

20. The computer program product of claim 17, wherein a key image section of the one or more key image sections from the image comprises a cropped portion of the image.

* * * * *